United States Patent [19]

Lenzen

[11] Patent Number: 4,858,951
[45] Date of Patent: Aug. 22, 1989

[54] IGNITER FOR GAS GENERATING MATERIAL

[75] Inventor: Reiner Lenzen, Almont, Mich.

[73] Assignee: TRW Vehicle Safety Systems, Inc., Lyndhurst, Ohio

[21] Appl. No.: 190,479

[22] Filed: May 4, 1988

[51] Int. Cl.$^4$ .............................................. B60R 21/10
[52] U.S. Cl. .................................................... 280/741
[58] Field of Search ............................... 280/736, 741

[56] References Cited

U.S. PATENT DOCUMENTS

| | | | |
|---|---|---|---|
| 3,904,221 | 9/1975 | Shiki et al. | 280/736 |
| 4,005,876 | 2/1977 | Jorgensen et al. | 280/741 |
| 4,561,675 | 12/1985 | Adams et al. | 280/734 |

Primary Examiner—Kenneth R. Rice
Attorney, Agent, or Firm—Tarolli, Sundheim & Covell

[57] ABSTRACT

An apparatus for igniting gas generating material includes a container having ignitable material for igniting the gas generating material upon ignition of the ignitable material. The ignitable material ignites when heated to a predetermined temperature. The ignitable material includes booster material and auto-ignition material which ignites when heated to the predetermined temperature. The ignitable material is a homogeneous mixture of the booster material and the auto-ignition material and has a ratio by weight of the booster material to the auto-ignition material of between 1.25 to 1 and 30 to 1. The booster material is a BKNO$_3$ based compound and the auto-ignition material is a smokeless powder which ignites at a temperature in the range of 300° F.–400° F.

19 Claims, 3 Drawing Sheets

IGNITER FOR GAS GENERATING MATERIAL

BACKGROUND OF THE INVENTION

1. Technical Field

The present invention relates to an inflatable vehicle occupant restraint system having ignitable gas generating material for inflating an airbag. In particular, the present invention relates to an igniter for igniting gas generating material.

2. Description of the Prior Art

Igniters for igniting gas generating material in inflatable vehicle occupant restraint systems are known. One such igniter is disclosed in U.S. Pat. No. 4,561,675. In U.S. Pat. No. 4,561,675, the igniter and gas generating material are supported in an aluminum housing having a mechanical strength which degrades when heated to an elevated temperature. If the gas generating material is ignited when the aluminum housing is at a temperature of about 650° F., the housing may burst and pieces of the housing may fly in all directions. To avoid this problem, U.S. Pat. No. 4,561,675 uses an auto-ignition material located in a container adjacent the igniter. The auto-ignition material is a smokeless powder and ignites at approximately 350° F. The auto-ignition material ignites the booster material which, in turn, ignites the gas generating material or the auto-ignition material ignites the gas generating material directly. At 350° F. the aluminum housing has sufficient strength to retain the pressure resulting from the generation of gas by the gas generating material so that the housing does not rupture or fragment. The structure of U.S. Pat. No. 4,561,675 has a disadvantage, however, in that the auto-ignition material is in a separate container which adds cost and extra steps to the assembly of the inflator.

Another known igniter for igniting gas generating material in a vehicle occupant restraint system includes a bridgewire connected to electrically conductive leads. The leads are operatively connected with a power source. The bridgewire is coated with lead styphnate (lead trinitroresorcinate). Lead styphnate is an auto-ignition material. However, there are disadvantages in using lead styphnate. Among these disadvantages are that the auto-ignition temperature of 464° F. of lead styphnate is higher than the auto-ignition temperature of 350° F. of the smokeless powder used in U.S. Pat. No. 4,561,675 and lead styphnate is very difficult to handle safely when applied to the bridgewire.

SUMMARY OF THE INVENTION

The present invention is an igniter for igniting gas generating material to produce gas that will, for example, inflate an inflatable vehicle occupant restraint. The gas generating material is contained in a metal housing. The housing has mechanical properties which degrade when the housing is heated to a temperature on the order of 650° F. The igniter includes an ignitable material in a container. When the ignitable material burns, it ignites the gas generating material. The ignitable material comprises an ignitable booster material and an auto-ignition material which auto-ignites when heated to a temperature in the range of 300° F. to 400° F. The ratio by weight of the booster material to the auto-ignition material is between 1.25 to 1 and 30 to 1. The booster material is preferably $BKNO_3$ (boron-potassium nitrate) mixed with $TiH_2$ (titanium hydride) and $KClO_4$ (potassium perchlorate).

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

The present invention is directed to an igniter for igniting gas generating material. In particular, the present invention is an igniter for igniting gas generating material in an inflatable vehicle occupant restraint system. The structure of the occupant restraint system may vary. By way of example, a vehicle occupant restraint system 10 is illustrated in FIG. 1.

The vehicle occupant restraint system 10 includes an inflatable airbag 12. When the vehicle is involved in a collision, the airbag 12 is expanded from a collapsed condition, illustrated in solid lines in FIG. 1, to an expanded condition, illustrated in dashed lines in FIG. 1, by a rapid flow of gas from an inflator 20. When the airbag 12 is in the expanded condition, it restrains movement of an occupant of the vehicle and prevents the occupant from violently impacting parts of the vehicle interior during a collision. The airbag 12 then quickly collapses so that the occupant is free to exit from the vehicle. To permit the airbag 12 to collapse, the airbag 12 is preferably formed of a porous material which enables the gas to flow out of the airbag.

Figure 1:
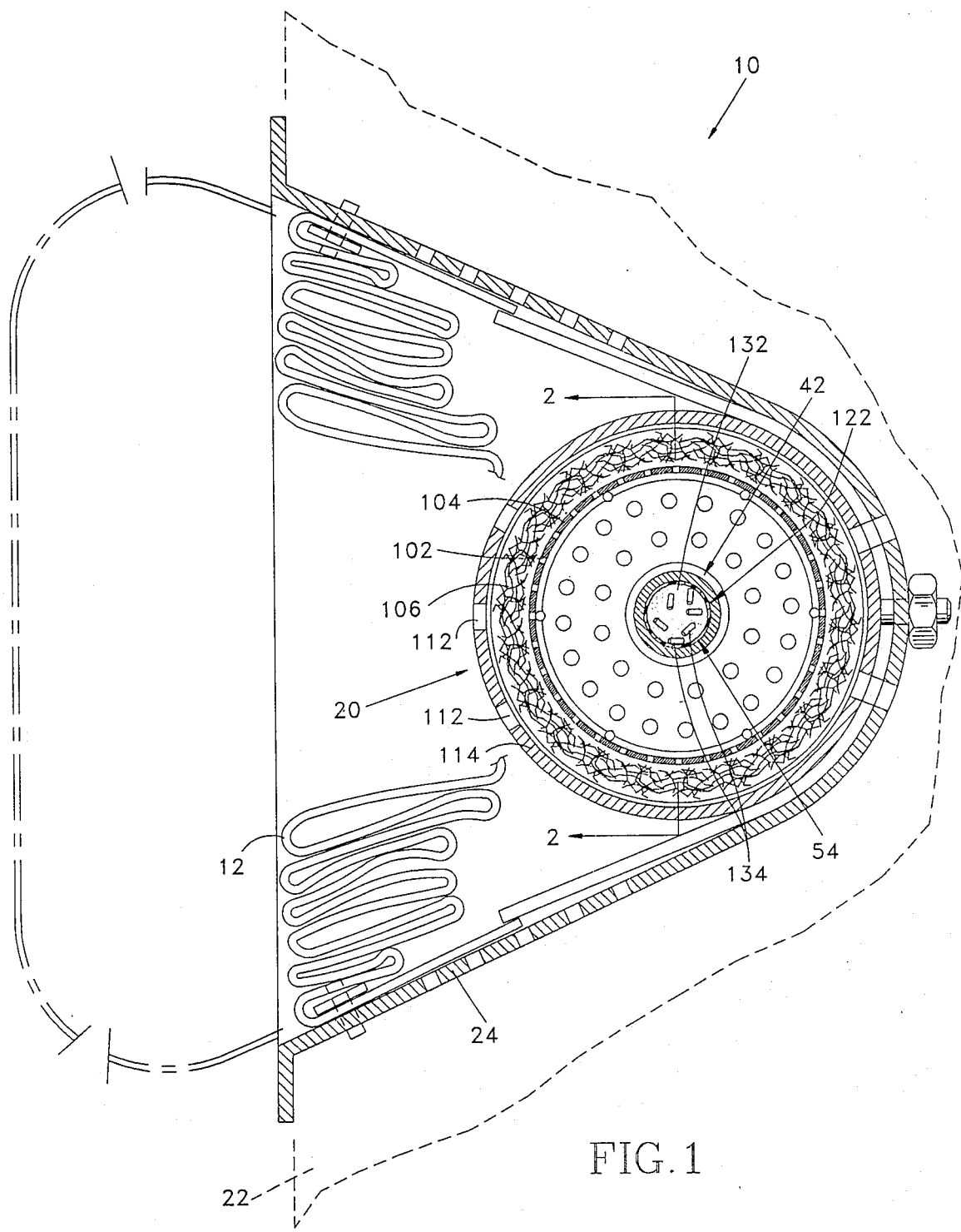
FIG. 1 is a cross-sectional view of an inflatable occupant restraint system embodying the present invention.

Although the airbag 12 could be mounted on many different parts of the vehicle, it is illustrated in FIG. 1 as mounted on a dashboard 22 of the vehicle. The airbag 12 is fixed to a rigid metal reaction canister 24 which is fixed to the dashboard 22. The inflator 20 is oriented within the reaction canister 24 so that the flow of gas from the inflator 20 causes the airbag 12 to expand into the passenger compartment. The inflator 20 will not be described in detail since it does not form part of the present invention and is disclosed in co-pending U.S. patent application Ser. No. 915,266, filed Oct. 3, 1986, assigned to the assignee of the present invention.

Figure 2:
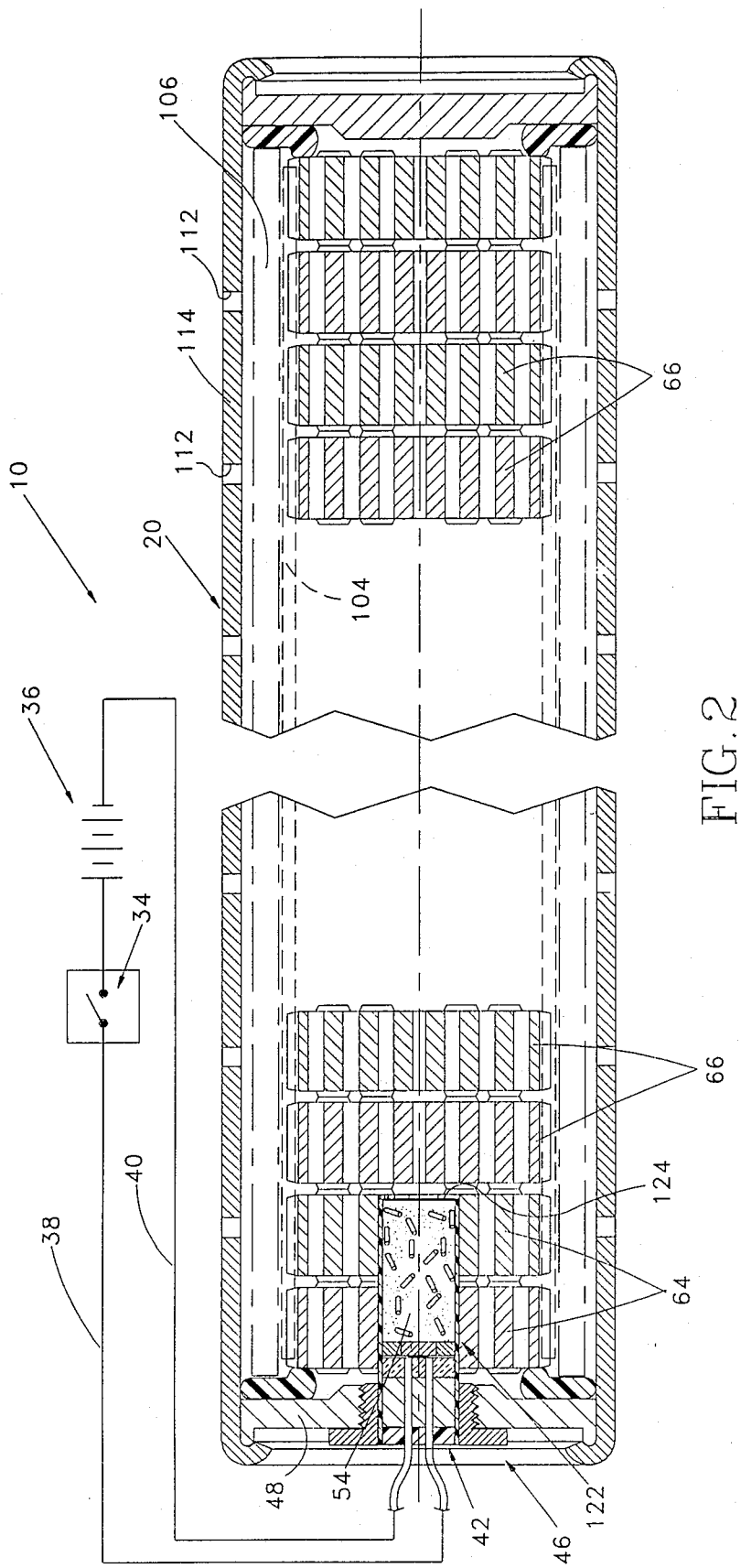
FIG. 2 is a schematic view partly in section of an inflator of the inflatable occupant restraint system of FIG. 1, taken approximately along line 2—2 of FIG. 1.

Upon the occurrence of a collision, an inertia switch 34 (FIG. 2) closes. The switch 34 is connected with a power source 36 of the vehicle. The switch 34 and power source 36 are connected in series by wires 38, 40 to a squib or igniter 42 located at one end of the inflator 20. When electrical current of a predetermined magnitude is conducted to the igniter 42, the igniter fires.

It will be apparent that many different types or designs of the igniter 42 is possible. By way of example, the igniter 42 is cylindrical in shape and is supported by a cylindrical portion 44 (FIG. 3) of a holder 46. The holder 46 is threaded into an end plate 48 of the inflator 20. A bridgewire 52 is located within the igniter 42 and is located axially adjacent bridgewire mix 56. The bridgewire mix 56 is preferably from 5 to 40 milligrams of zirconium potassium perchlorate. Ignitable material 54 is located within the igniter 42 and axially adjacent the bridgewire mix 56. When the electrical current of the predetermined magnitude is applied to the bridgewire 52, the bridgewire 52 is rapidly heated to ignite a bridgewire mix 56. The heat generated by the ignition of the bridgewire mix 56 ignites the ignitable material 54.

Figure 3:
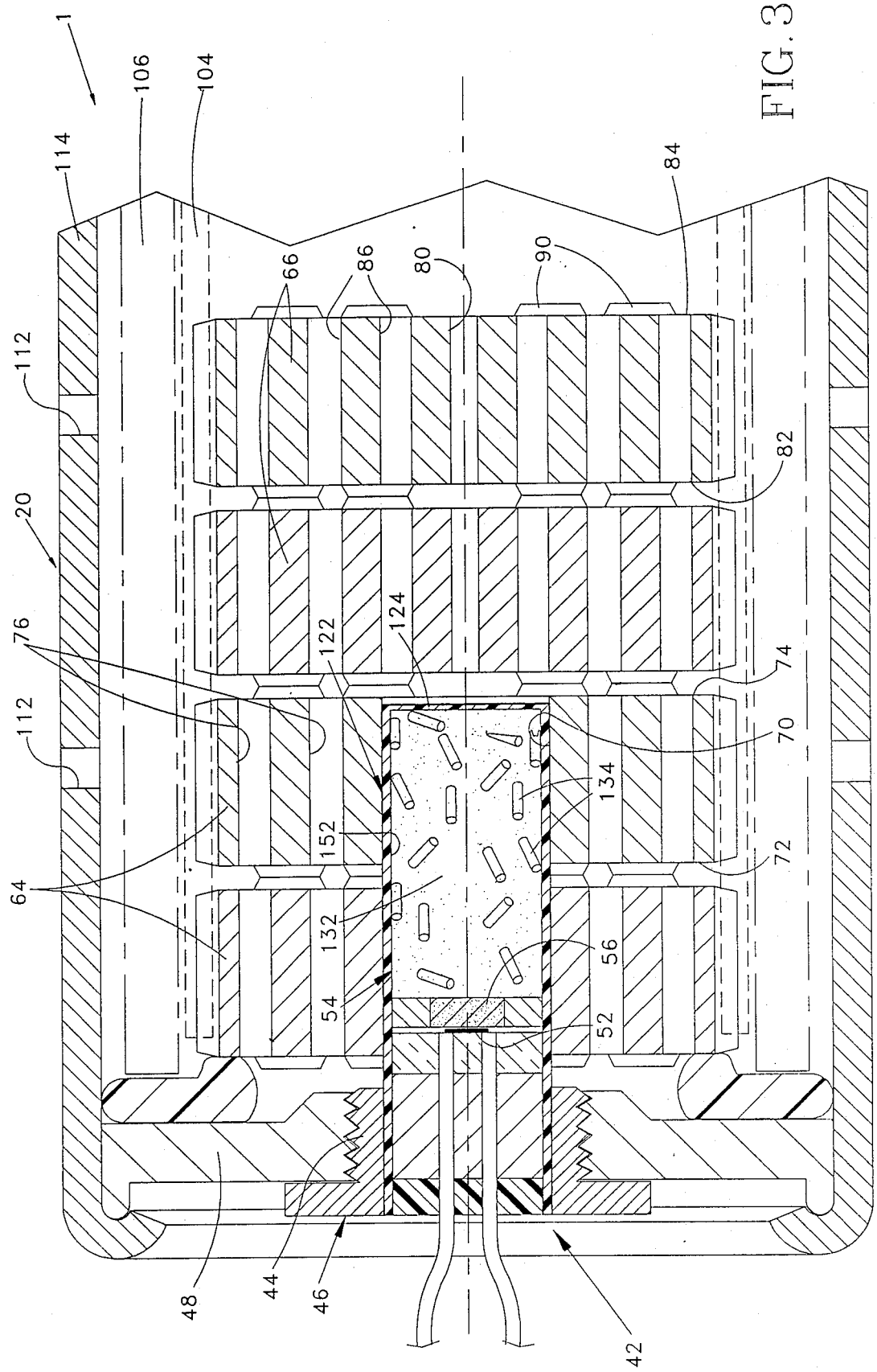
FIG. 3 is an enlarged cross-sectional view of a portion of the inflator illustrated in FIG. 2.

Hot gasses and flame from the ignitable material 54 cause ignition of gas generating material supported in the inflator 20. The gas generating material includes a plurality of cylindrically shaped grains 64 which encircle the igniter 42, as shown in FIG. 3, and a plurality of coaxial cylindrically shaped grains 66 which are adjacent one another and spaced from the igniter 42. Combustion of the grains 64, 66 occurs quickly to generate a relatively large volume of gas rapidly, which gas is directed into the airbag 12. More specifically, the airbag 12 is expected to inflate in 20 to 40 milliseconds after closing of the switch 34.

Each of the cylindrical grains 64 has a cylindrical central passage 70 which receives the igniter 42. The passage 70 extends through the grains 64 between axially opposite end faces 72, 74 of the grains. The longitudinal central axis of the passage 70 is coincident with the longitudinal central axis of the grains 64. In order to maximize the rate of combustion of the grains 64, a plurality of cylindrical passages 76 extend through the grains 64 between the axially opposite end faces 72, 74. The axes of the passages 76 extend parallel to the longitudinal central axes of the grains 64 and the central passages 70.

Each of the grains 66 has a relatively small diameter cylindrical central passage 80 having a longitudinal central axis coincident with the longitudinal central axis of the grain 66. The passage 80 extends between opposite axial end faces 82, 84 of the grain 66. In addition, each grain 66 has a plurality of cylindrical passages 86 which extend axially through the grain 66 between the opposite end faces 82, 84. The longitudinal central axes of the passages 86 extend parallel to the longitudinal central axes of the passage 80 and the grain 66. The cross sections of the passages 76, 80, 86 are circular, identical in diameter and uniform throughout their extent. The passages are located to promote uniform combustion of the grains 66 as described in detail in co-pending application Ser. No. 915,266, filed Oct. 3, 1986, the disclosure of which is fully incorporated herein by reference. The grains 64, 66 are preferably made of an alkali metal azide compound as disclosed in U.S. Pat. No. 4,696,705, the disclosure of which is also fully incorporated herein by reference.

The gas which is generated within the various passages of the grains 64, 66 flows from the passages 70, 76, 80, 86 to inflate the airbag 12. To provide for such flow, spaces are provided between axial end faces of adjacent grains. The spaces at opposite axial ends of the grains extend radially outwardly from the central passages 70, 80 of the grains to the cylindrical outer side surfaces of the grains. The spaces are provided by axially projecting standoff pads or projections 90 formed on the axially opposite end faces of the grains. The standoff pads 90 for one grain engage the standoff pads 90 on the adjacent grain to provide spaces of equal width or axial extent between the adjacent grains.

The gas generated by combustion of the grains 64, 66 flows radially through openings 102 in a rigid cylindrical metal tube 104 (FIGS. 1 and 2) which surrounds the grains 64, 66. The gas then flows through a filter 106. The filter 106 is preferably made of a plurality of layers of wire mesh, steel wool and fiberglass. The filter 106 prevents sparks and/or particles of hot material from entering the airbag 12.

Lastly, the gas flows through openings 112 in a cylindrical side wall of an inflator housing 114 into the reaction canister 24 and the airbag 12. The housing 114 is preferably made of an aluminum alloy so that the weight of the inflator 20 is kept to a minimum. When the housing 114 is subjected to a relatively high temperature, for example about 650° F., the mechanical properties, such as strength, of the aluminum alloy degrade.

The igniter 42 (FIG. 3) includes a container 122 for the ignitable material 54. The container 122 is expoxied in the holder 46. The container 122 is generally cylindrical in shape and has a cruciform stamped into the end portion 124 of the container and comprises score lines in the end portion 124 which weaken the end portion of the container, as is known. The container 122 is made preferably of a metal such as aluminum or steel so heat external to the container is conducted relatively quickly through the container. When the ignitable material 54 ignites, the end portion 124 of the container ruptures along the score lines of the cruciform and opens, and a flame is directed out of the container to ignite the grains 64, 66 of the gas generating material.

The ignitable material 54 is a booster material 132 and an auto-ignition material 134 which ignites when heated to a temperature between 300° F. to 400° F., both of which are located in the container 122. The ignitable material 54 is preferably a homogeneous mixture of the booster material 132 and the auto-ignition material 134. The ratio by weight of the booster material 132 to the auto-ignition material 134 in the mixture of ignitable material 54 is between 1.25 to 1 and 30 to 1. By way of example, 250 milligrams to 1.5 grams of booster material may be used and 50 to 200 milligrams of auto-ignition material may be used.

The booster material 132 is preferably one gram of a homogeneous mixture of between 70 to 74% by weight of $BKNO_3$ (boron potassium nitrate) and 26 to 30% by weight of a homogeneous mixture of $TiH_2$ (titanium hydride) and $KClO_4$ (potassium perchlorate). The booster material 152 ignites when heated to approximately 700° F. The $BKNO_3$ consists of a mixture of between 22% to 26% by weight of boron, 69% to 73% by weight of potassium nitrate and 2% to 6% by weight of a binder, such as Viton. The mixture of $TiH_2$ and $KClO_4$ consists of 27% to 31% by weight of $TiH_2$, 65% to 69% by weight of $KClO_4$ and between 2% to 6% by weight of a binder such as Viton.

The auto-ignition material 134 is preferably 100 milligrams of a smokeless powder such as IMR 4895 which is available from IMR Powder Company of Plattsburgh, New York. While IMR 4895 smokeless powder is preferred, other smokeless powders, such as any available nitrocelluose powder or gunpowder may be used. In the preferred embodiment, the IMR 4895 smokeless powder ignites at approximately 350° F.

The auto-ignition material 134 comprises many small cylindrical grains randomly oriented throughout the mixture of the ignitable material 54. Some of the grains of the auto-ignition material 134 contact or are in close proximity to the interior surface 152 of the container 122. When the heat external to the container 122 is conducted to the interior of the container, the grains of the auto-ignition material 134 contacting or adjacent the container are heated. When the grains are heated to a temperature of 350° F., they ignite. Thus, when the inflator 20 is exposed to relatively high temperatures, such as might occur if the vehicle catches on fire, the gas generating material is ignited before the housing 114 of the inflator 20 is heated to a temperature at which its strength is degraded. In the illustrated embodiment, the grains of the auto-ignition material 134 are located throughout the mixture, however, the grains could be concentrated near an exterior wall of the container 122.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. An apparatus for igniting gas generating material, said apparatus comprising:
    a container; and
    an ignitable material located in said container for igniting the gas generating material upon ignition of said ignitable material, said ignitable material igniting when heated to a predetermined temperature,
    said ignitable material comprising a homogeneous mixture of auto-ignition material which ignites when heated to said predetermined temperature and booster material which ignites at a temperature greater than the temperature at which said auto-ignition material ignites.

2. The apparatus set forth in claim 1 wherein said homogeneous mixture has a ratio by weight of said booster material to said auto-ignition material of between 1.25 to 1 and 30 to 1.

3. The apparatus set forth in claim 2 wherein said booster material comprises a homogeneous mixture of 70 to 74 percent by weight of $BKNO_3$, and 26 to 30 percent by weight of a homogeneous mixture of $TiH_2$ and $KClO_4$.

4. The apparatus set forth in claim 3 wherein said homogeneous mixture of $TiH_2$ and $KClO_4$ consists of 27 to 31 percent by weight of $TiH_2$, 65 to 69 percent by weight of $KClO_4$ and 2 to 6 percent by weight of a binder.

5. The apparatus set forth in claim 3 wherein said $BKNO_3$ material consists of a homogeneous mixture of 22 to 26 percent by weight of boron, 69 to 73 percent by weight of potassium nitrate and 2 to 6 percent by weight of a binder.

6. The apparatus set forth in claim 1 wherein said container is metal and a portion of said auto-ignition material contacts said container, and said auto-ignition material ignites upon being heated to the predetermined temperature by conduction of heat through said container.

7. An apparatus for igniting gas generating material, said apparatus comprising:
    a container; and
    an ignitable material located in said container for igniting the gas generating material upon ignition of said ignitable material, said ignitable material comprising a homogeneous mixture of:
    a boron and potassium nitrate based compound, and
    an auto-ignition material which ignites when heated to a temperature in the range of 300° F. to 400° F.

8. The apparatus set forth in claim 7 wherein said mixture of said ignitable material comprises a ratio by weight of said boron and potassium based nitrate compound to said auto-ignition material of between 1.25 to 1 and 30 to 1.

9. The apparatus set forth in claim 8 wherein said boron and potassium nitrate based compound ignites at a temperature of about 700° F. and said auto-ignition material ignites at a temperature of about 350° F.

10. The apparatus set forth in claim 8 wherein said boron and potassium nitrate based compound comprises a homogeneous mixture of 70 to 74 percent by weight of $BKNO_3$ and 26 to 30 percent by weight of a homogeneous mixture of $TiH_2$ and $KClO_4$.

11. The apparatus set forth in claim 10 wherein said homogeneous mixture of $TiH_2$ and $KClO_4$ consists of 27 to 31 percent by weight of $TiH_2$, 65 to 69 percent by weight of $KClO_4$ and 2 to 6 percent by weight of a binder.

12. The apparatus set forth in claim 11 wherein said $BKNO_3$ consists of a homogeneous mixture of 22 to 26 percent by weight of boron, 69 to 73 percent by weight of potassium nitrate and 2 to 6 percent by weight of a binder.

13. An apparatus for inflating an inflatable vehicle occupant restraint upon deceleration of the vehicle at a rate above a predetermined rate, said apparatus comprising:
    a housing containing gas generating material, said housing having mechanical properties which degrade when said housing is heated to a temperature about 650° F.; and
    means for igniting the gas generating material in response to being heated to a predetermined temperature substantially lower than 650° F. and in response to deceleration of the vehicle at a rate above the predetermined rate, said means comprising:
    a container supported by said housing adjacent the gas generating material;
    an ignitable material which is located in said container and which upon ignition ignites the gas generating material; and
    means for igniting the ignitable material in response to deceleration of the vehicle above the predetermined rate of deceleration;
    said ignitable material comprising a homogeneous mixture of a booster material and an auto-ignition material which ignites upon being heated to the predetermined temperature to ignite said booster material and to thereby ignite the gas generating material.

14. The apparatus set forth in claim 13 wherein said booster material ignites at a temperature of approximately 700° F. and said auto-ignition material ignites at a temperature of approximately 350° F.

15. The apparatus set forth in claim 13 wherein said mixture of said ignitable material comprises a ratio by weight of said booster material to said auto-ignition material of between 1.25 to 1 and 30 to 1.

16. The apparatus set forth in claim 15 wherein said booster material comprises a homogeneous mixture of 70 to 74 percent by weight of $BKNO_3$ and 26 to 30 percent by weight of a homogeneous mixture of $TiH_2$ and $KClO_4$.

17. The apparatus set forth in claim 15 wherein said auto-ignition material comprises a smokeless powder which auto-ignites when heated to 350° F.

18. The apparatus set forth in claim 13 wherein said means for igniting said ignitable material includes a bridgewire electrically connected at opposite ends to respective conductors which are operatively connected to a power source, said bridgewire being located in said container and encapsulated by said ignitable material.

19. The apparatus set forth in claim 18 wherein said container is metal and a portion of said auto-ignition material contacts said container, and said auto-ignition material ignites upon being heated to the predetermined temperature by conduction of heat through said container.

* * * * *